United States Patent
Brown et al.

(10) Patent No.: US 10,162,562 B2
(45) Date of Patent: Dec. 25, 2018

(54) ENABLING POINT-IN-TIME-COPY TARGET VOLUMES TO BE PRIMARY VOLUMES IN CASCADED DATA REPLICATION SYSTEMS

(71) Applicant: International Business Machines Corporation, Armonk, NY (US)

(72) Inventors: Theresa M. Brown, Tucson, AZ (US); Nicolas M. Clayton, Warrington (GB); Theodore T. Harris, Jr., Tucson, AZ (US); Gregory E. McBride, Vail, AZ (US); Carol S. Mellgren, Tucson, AZ (US); Raul E. Saba, Tucson, AZ (US); David B. Schreiber, Tucson, AZ (US); Chuong H. Tran, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/362,678

(22) Filed: Nov. 28, 2016

(65) Prior Publication Data

US 2018/0150229 A1    May 31, 2018

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01); *G06F 3/0644* (2013.01)

(58) Field of Classification Search
CPC ............. G06F 11/2056; G06F 11/2058; G06F 11/2064; G06F 11/2084; G06F 11/1458;
(Continued)

(56) References Cited

U.S. PATENT DOCUMENTS

| 6,457,109 | B1 * | 9/2002 | Milillo ................. G06F 3/0605 711/161 |
| 7,165,141 | B2 | 1/2007 | Cochran et al. |

(Continued)

OTHER PUBLICATIONS ip.com, "GMIR Consistency Group Formation—Surrender Mechanism," IP.com No. IPCOM000197247D, Jun. 29, 2010.
(Continued)

*Primary Examiner* — Charles Rones
*Assistant Examiner* — Hewy H Li
(74) *Attorney, Agent, or Firm* — Nelson and Nelson; Daniel P. Nelson; Alexis V. Nelson

(57) ABSTRACT

A method for enabling point-in-time-copy target volumes to be primary volumes in PPRC relationships is disclosed. In one embodiment, such a method includes reserving, on a first storage device, first resources needed to establish a first point-in-time-copy relationship between a first source volume and a first target volume. The method further sends a reservation request to a second storage device to reserve second resources needed to establish, on the second storage device, a second point-in-time-copy relationship between a second source volume and a second target volume. In the event the reservation request is successfully executed, the method establishes the first point-in-time-copy relationship on the first storage device using the first resources, and sends a check-in request to the second storage device to establish the second point-in-time-copy relationship on the second storage device using the second resources. A corresponding system and computer program product are also disclosed.

20 Claims, 8 Drawing Sheets

(58) Field of Classification Search
CPC .. G06F 11/1469; G06F 11/1464; G06F 3/065; G06F 3/0644; G06F 3/0619; G06F 3/067
See application file for complete search history.

(56) References Cited

U.S. PATENT DOCUMENTS

| | | | |
|---|---|---|---|
| 7,966,293 B1 | 6/2011 | Owara et al. | |
| 2003/0177321 A1 | 9/2003 | Watanabe | |
| 2005/0114573 A1* | 5/2005 | Chen | G06F 3/0605 710/74 |
| 2008/0034178 A1 | 2/2008 | Nagata | |
| 2012/0254114 A1* | 10/2012 | Gundy | G06F 17/30088 707/639 |
| 2015/0081628 A1* | 3/2015 | Brown | G06F 11/2056 707/613 |
| 2015/0212897 A1* | 7/2015 | Kottomtharayil | G06F 11/1448 714/20 |

OTHER PUBLICATIONS ip.com, "Performance Optimisations in Cascaded FlashCopy Systems," IP.com No. IPCOM000199838D, Sep. 17, 2010.
ip.com, "Preserving point-in-time objectives in block level incremental snapshot systems—by cascading snapshots," IP.com No. IPCOM000200576D, Oct. 19, 2010.

* cited by examiner

ENABLING POINT-IN-TIME-COPY TARGET VOLUMES TO BE PRIMARY VOLUMES IN CASCADED DATA REPLICATION SYSTEMS

BACKGROUND

Field of the Invention

This invention relates to systems and methods for enabling point-in-time-copy target volumes to be primary volumes in cascaded data replication systems.

Background of the Invention

In data replication environments such as Peer-to-Peer-Remote-Copy ("PPRC") environments, data is mirrored from a primary storage device to a secondary storage device to maintain two identical copies of the data. The primary and secondary storage devices may be located up to several hundred kilometers from one another. In the event the primary storage device fails, I/O may be redirected to the secondary storage device, thereby enabling continuous data availability. In certain implementations, additional storage devices may be added to the data replication environment to create a cascade of storage devices. For example, a third storage device, possibly at a third site, may be linked (either synchronously or asynchronously) to the secondary storage device to create a third copy of the data. This third copy may be desired in situations where the primary and secondary storage devices have experienced failures or issues with data integrity. In such configurations, the secondary storage device may act as the primary storage device as it relates to the third storage device.

In certain cases, a user may wish to create point-in-time copies (e.g., FlashCopies) of volumes on each of the storage devices that are arranged in a cascade. These point-in-time copies may be used to recover data to a desired point in time. This may be needed, for example, in the event a batch job or other operation fails, or data is corrupted and needs to be restored. The point-in-time copies may also be used in test environments. Users may desire to maintain consistent point-in-time copies on remotely located storage devices for backup and/or testing purposes.

Currently, a volume that is a target in a point-in-time-copy relationship cannot be the primary in a PPRC relationship if the secondary of that PPRC relationship is itself also a primary in a PPRC relationship, as may occur in a cascaded configuration of three or more storage devices, as described above. Stated otherwise, a point-in-time-copy target volume cannot typically be a primary volume in a cascaded data replication system.

In view of the foregoing, what are needed are systems and methods to enable point-in-time-copy target volumes to be primary volumes in cascaded data replication systems.

SUMMARY

The invention has been developed in response to the present state of the art and, in particular, in response to the problems and needs in the art that have not yet been fully solved by currently available systems and methods. Accordingly, the invention has been developed to enable point-in-time-copy target volumes to be primary volumes in PPRC relationships. The features and advantages of the invention will become more fully apparent from the following description and appended claims, or may be learned by practice of the invention as set forth hereinafter.

Consistent with the foregoing, a method for enabling point-in-time-copy target volumes to be primary volumes in PPRC relationships is disclosed. In one embodiment, such a method includes reserving, on a first storage device, first resources needed to establish a first point-in-time-copy relationship between a first source volume and a first target volume. The method further sends a reservation request to a second storage device to reserve second resources needed to establish, on the second storage device, a second point-in-time-copy relationship between a second source volume and a second target volume. In the event the reservation request is successfully executed, the method establishes the first point-in-time-copy relationship on the first storage device using the first resources, and sends a check-in request to the second storage device to establish the second point-in-time-copy relationship on the second storage device using the second resources.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
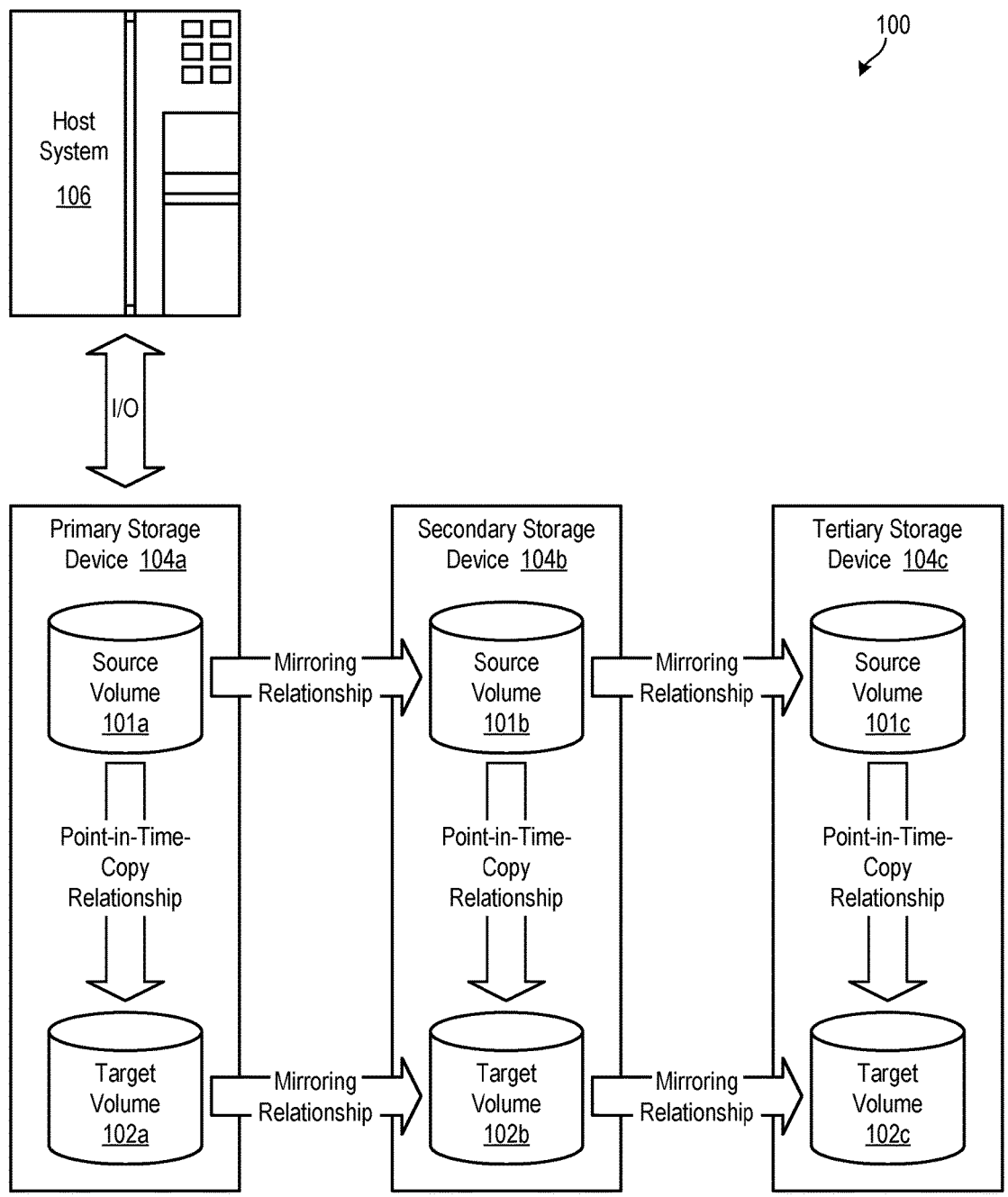
FIG. 1 is a high-level block diagram showing one example of a data replication environment comprising three storage devices arranged in a cascaded configuration.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Referring to FIG. 1, as previously explained, in data replication environments 100 such as Peer-to-Peer-Remote-Copy ("PPRC") environments 100, data originating from a host system 106 or other source is written to the primary storage device 104a and mirrored from a primary storage device 104a to a secondary storage device 104b to maintain two identical copies of the data. The primary and secondary storage devices 104a, 104b may be located hundreds of kilometers away from one another. In the event the primary storage device 104a fails, 110 may be redirected to the secondary storage device 104b, thereby enabling continuous data availability. In certain implementations, additional storage devices 104c may be added to the data replication environment 100 to create a cascade of storage devices 104. For example, a third storage device 104c, possibly at a third site, may be linked (either synchronously or asynchronously) to the secondary storage device 104b to create a third copy of the data. This third copy may be needed in situations where the primary and secondary storage devices 104a, 104b have experienced failures or issues with data integrity. In such configurations, the secondary storage device 104b may act as the primary storage device as it relates to the third storage device 104c.

In certain cases, a user may wish to create point-in-time copies (e.g., FlashCopies) of volumes on each of the storage devices 104a-c that are arranged in a cascaded configuration. These point-in-time copies may be used to recover data back to a desired point in time. This may be needed, for example, in the event a batch job or other operation fails, or data is corrupted and needs to be restored. The point-in-time copies may also be used in test environments. Users may desire to maintain consistent point-in-time copies on remotely located storage devices 104 for backup and/or testing purposes.

FIG. 1 shows an exemplary configuration comprising three storage devices 104 arranged in a cascaded configuration. Each storage device 104 includes a source volume 101 and a target volume 102 storing a point-in-time copy of data in the source volume 101. A mirroring relationship is established between the source volume 101a and the source volume 101b, and between the source volume 101b and the source volume 101c. Similarly, a mirroring relationship is established between the target volume 102a and the target volume 102b, and between the target volume 102b and the target volume 102c.

Unfortunately, a configuration such as that illustrated in FIG. 1 is not easily achieved using currently available data replication or copy service technology. Currently, a volume 102 that is a target in a point-in-time-copy relationship cannot be the primary in a PPRC relationship if the secondary of that PPRC relationship is itself also a primary in a PPRC relationship, as may occur in a cascaded configuration of three or more storage devices 104. Stated otherwise, a point-in-time-copy target volume 102 cannot be a primary volume in a cascaded data replication system 100. Thus, systems and methods are needed to enable point-in-time-copy target volumes 102 to be primary volumes in cascaded data replication systems 100.

Figure 2:
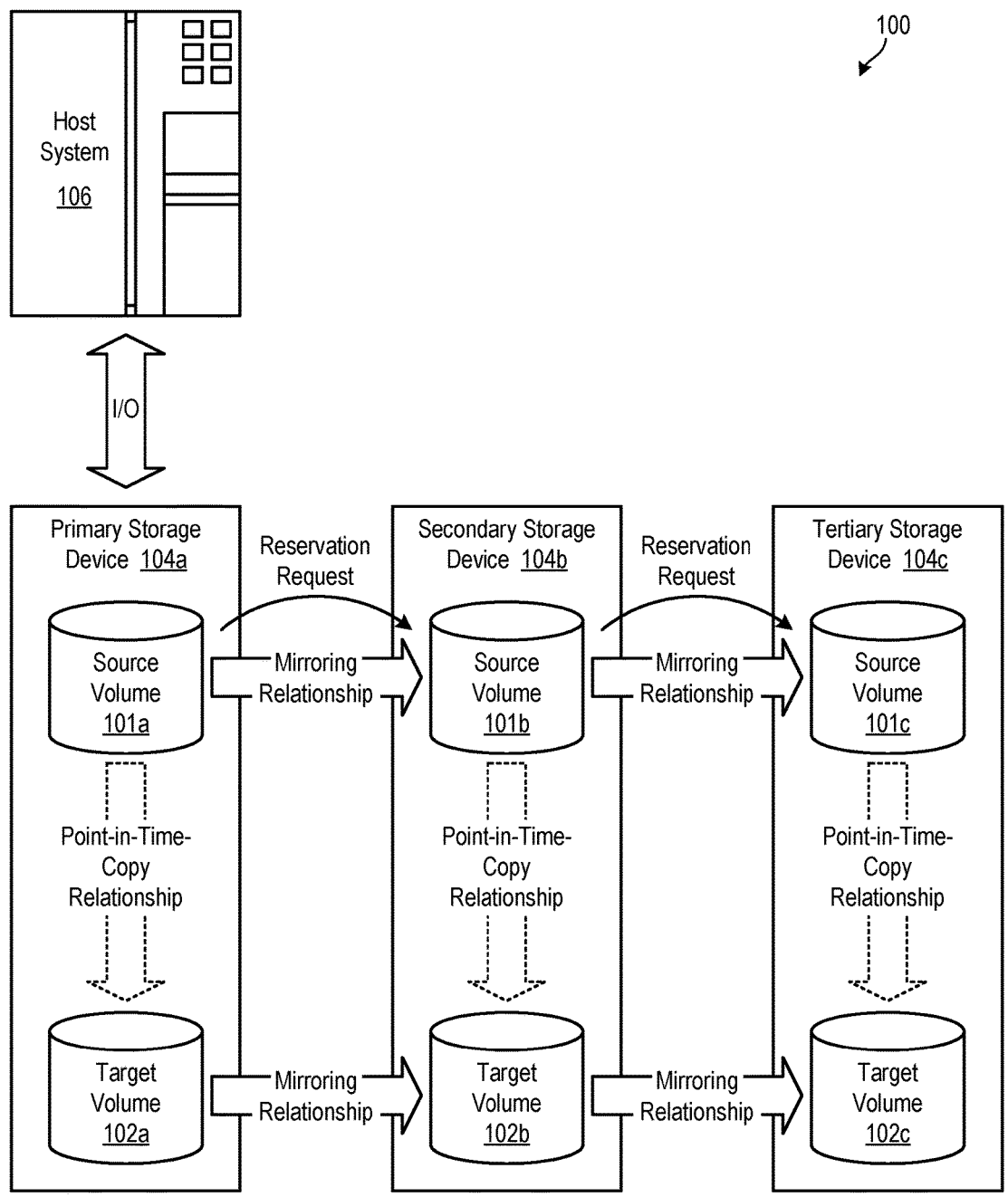
FIG. 2 is a high-level block diagram showing reservation requests being propagated between the cascaded storage devices, and resulting reservation of resources needed to establish point-in-time-copy relationships.

Referring to FIG. 2, in order to enable point-in-time-copy target volumes 102 to be primary volumes in a cascaded data replication system 100, a conventional point-in-time-copy establish command may be broken into separate reservation and check-in commands (also referred to herein as reservation and check-in requests). In general, a reservation request may be used to reserve resources, on a storage device 104, needed to establish a point-in-time-copy relationship between a source volume 101 and a target volume 102. The check-in request, by contrast, may actually establish or harden the point-in-time-copy relationship using the resources reserved by the reservation request. If needed resources are successfully reserved by a reservation request, a check-in request is more likely to succeed. In this way, systems and methods may reduce and/or avoid situations where a conventional point-in-time-copy establish command is issued and fails.

As shown in FIG. 2, in order to configure a cascaded data replication system 100 in the manner illustrated in FIG. 1, a source volume 101 and target volume 102 may be established on each of the storage devices 104. A mirroring relationship (e.g., a synchronous or asynchronous mirroring relationship) may be established between the source volume 101a and source volume 101b, and between the source volume 101b and source volume 101c. Similarly, a mirroring relationship may be established between the target volume 102a and target volume 102b, and between the target volume 102b and target volume 102c.

A primary storage device 104a may initially reserve resources on the primary storage device 104a needed to establish a point-in-time-copy relationship between the source volume 101a and target volume 102a (The dotted line used for the arrow indicates a reservation of resources needed to establish a point-in-time-copy relationship, as opposed to the actual establishment of a point-in-time-copy relationship, which is later indicated with a solid line). Once these resources are reserved, the primary storage device 104a may send a reservation request to the secondary storage device 104b. In response to this reservation request, the secondary storage device 104b may reserve resources on the secondary storage device 104b needed to establish a point-in-time-copy relationship between the source volume 101b and target volume 102b. Once the secondary storage device 104b reserves these resources, the secondary storage device 104b may send a reservation request to the tertiary storage device 104c to reserve resources needed to establish a point-in-time-copy relationship between the source volume 101c and target volume 102c.

Figure 3:
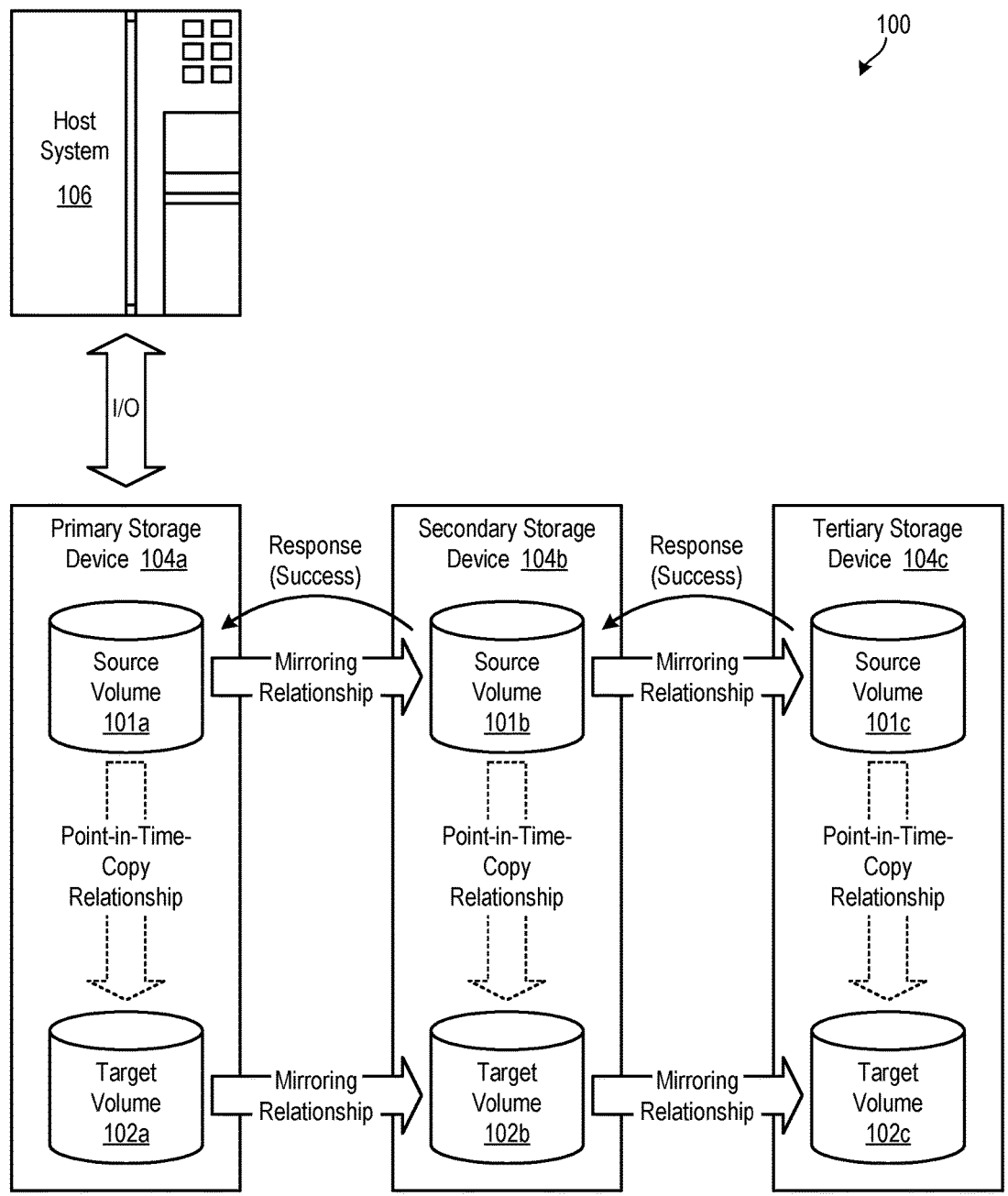
FIG. 3 is a high-level block diagram showing responses to the reservation requests being propagated between the cascaded storage devices.

Referring to FIG. 3, upon reserving the requested resources, the tertiary storage device 104c may return an acknowledgement to the secondary storage device 104b indicating that resources were successfully reserved on the tertiary storage device 104c. The secondary storage device 104b may then send an acknowledgement to the primary storage device 104a indicating that the resources were successfully reserved on the secondary storage device 104b and tertiary storage device 104c.

Figure 4:
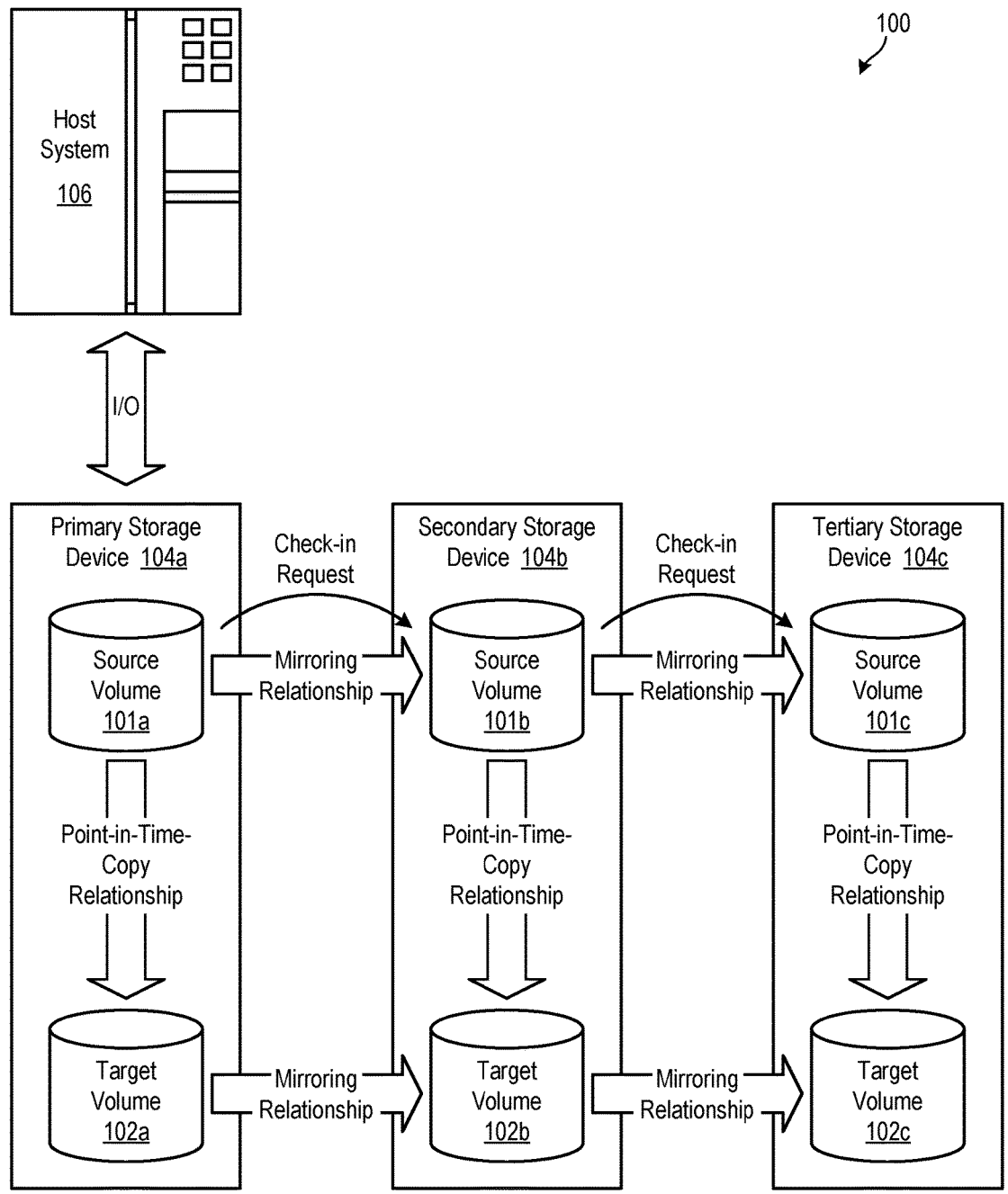
FIG. 4 is a high-level block diagram showing check-in requests being propagated between the cascaded storage devices, and resulting establishment of point-in-time-copy relationships on the cascaded storage devices.

Referring to FIG. 4, upon receiving the acknowledgement that resources were successfully reserved on the secondary storage device 104b and tertiary storage device 104c, the primary storage device 104a may establish the point-in-time-copy relationship between the source volume 101a and target volume 102a using the previously reserved resources. The primary storage device 104a may then send a check-in request to the secondary storage device 104b that instructs the secondary storage device 104b to establish the point-in-time-copy relationship between the source volume 101b and target volume 102b using the previously reserved resources. Once this point-in-time-copy relationship is established, the secondary storage device 104b may in turn send a check-in request to the tertiary storage device 104c instructing the tertiary storage device 104c to establish the point-in-time-copy relationship between the source volume 101c and target volume 102c using the previously reserved resources.

Figure 5:
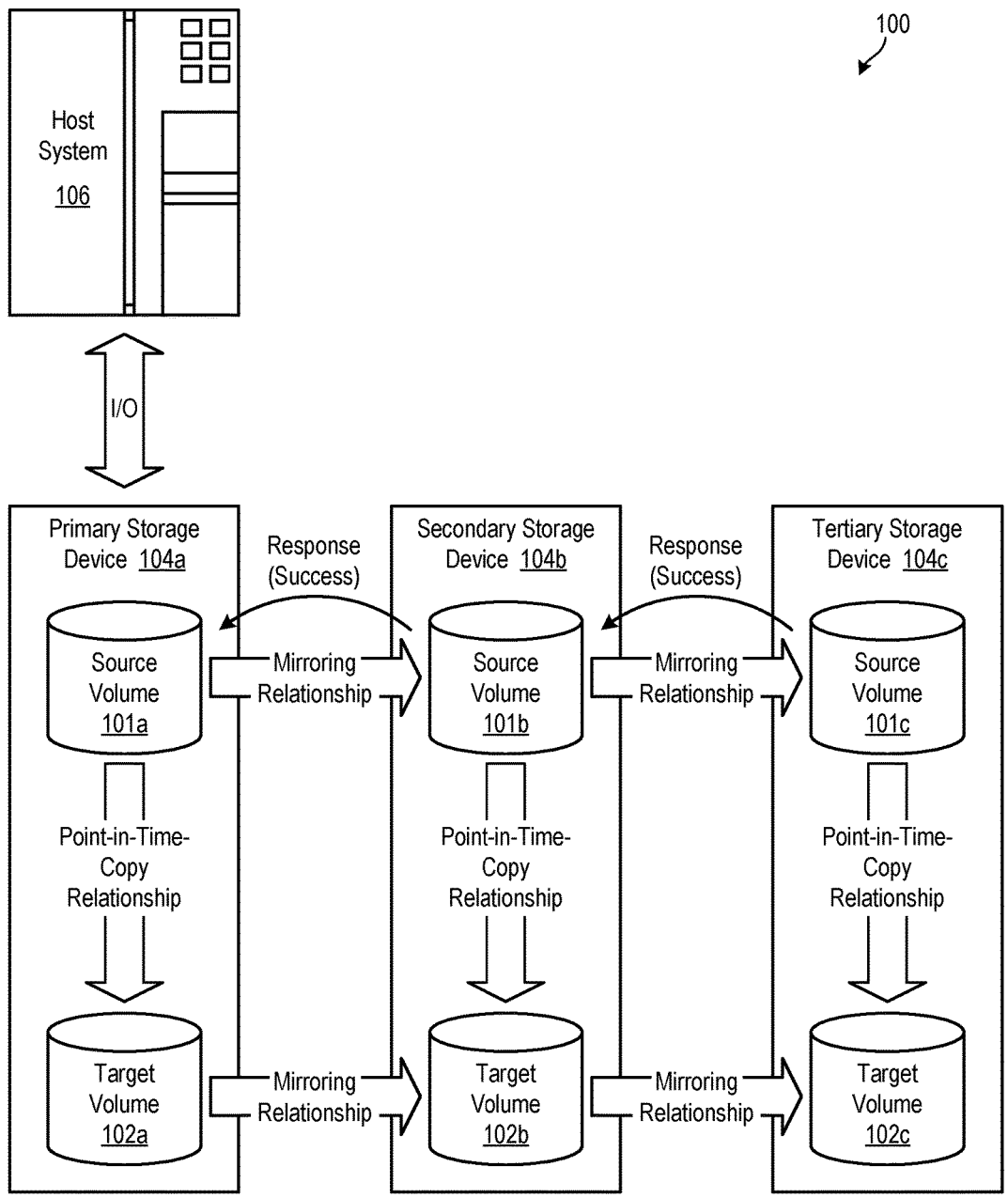
FIG. 5 is a high-level block diagram showing responses to the check-in requests being propagated between the cascaded storage devices.

Referring to FIG. 5, assuming each storage device 104 successfully establishes a point-in-time-copy relationship, the tertiary storage device 104c may return an acknowledgement to the secondary storage device 104b indicating that the point-in-time-copy relationship was successfully established. The secondary storage device 104b may then return an acknowledgement to the primary storage device 104a indicating that the point-in-time-copy relationship was successfully established on both the secondary storage device 104b and tertiary storage device 104c. The result is a cascaded data replication system 100 configured in the manner illustrated in FIG. 1. Although, the cascaded data replication system 100 is shown with three storage devices 104, the systems and methods disclosed herein may be readily extended to cascaded data replication systems 100 having more than three storage devices 104 in the cascade.

Figure 6:
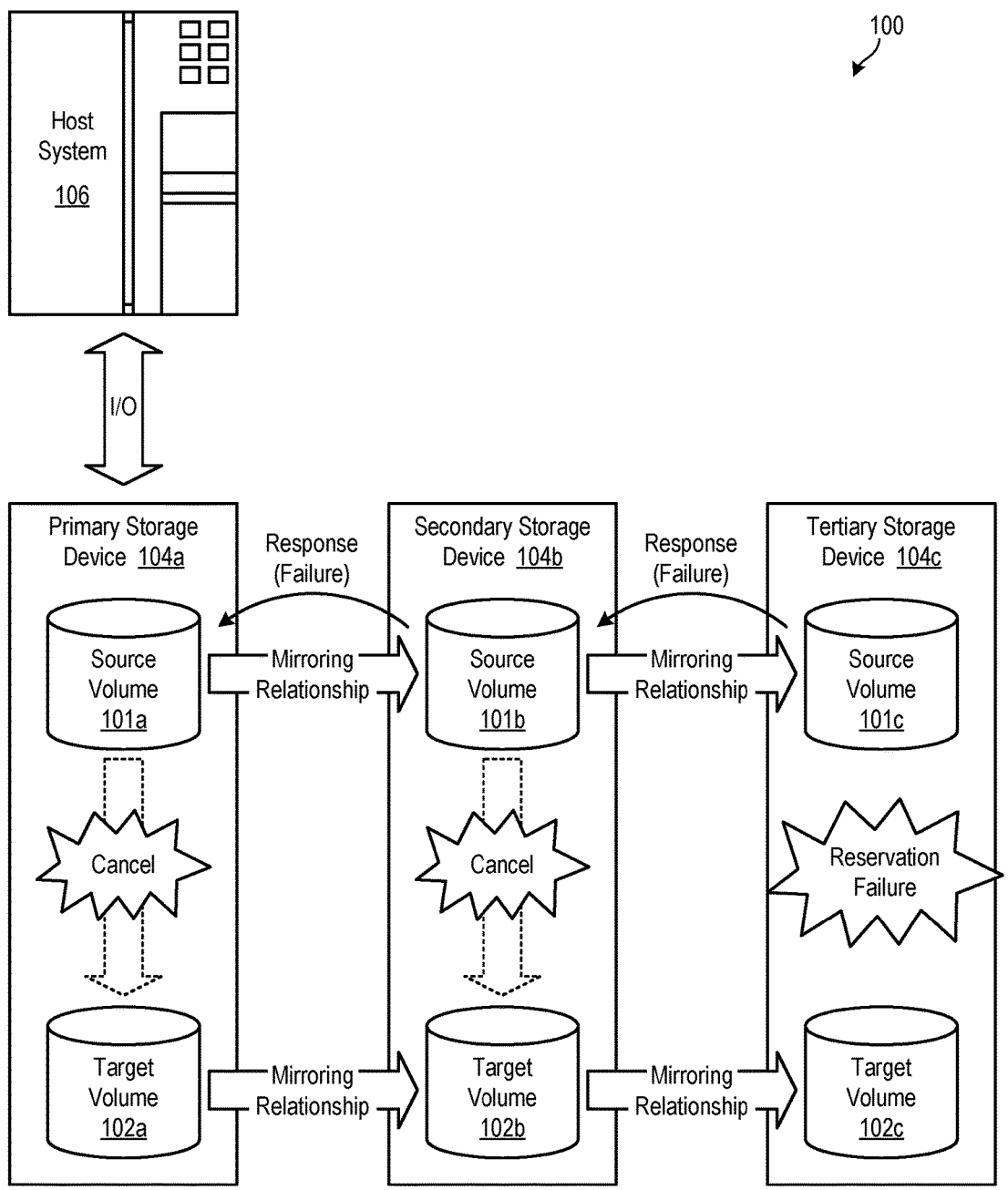
FIG. 6 is a high-level block diagram showing a scenario where a reservation request fails on the tertiary storage device, and the resulting cancelations of reservations on the other storage devices.

FIG. 6 shows a scenario where a reservation request fails. Assume, in this scenario, that the secondary storage device 104b sends a reservation request to the tertiary storage device 104c to reserve resources needed to establish a point-in-time-copy relationship between a source volume 101c and a target volume 102c. Further assume that the reservation request fails and the tertiary storage device 104c is unable to reserve the resources. In such a scenario, the tertiary storage device 104c sends a response to the secondary storage device 104b indicating that the reservation request failed. In response, the secondary storage device 104b cancels its reservation and returns a response to the primary storage device 104a indicating that the reservation request failed on the tertiary storage device 104c and/or that the reservation was canceled on the secondary storage device 104b. In response, the primary storage device 104a cancels its reservation of resources. The result is that no point-in-time-copy relationship is created on any of the storage devices 104.

Figure 7:
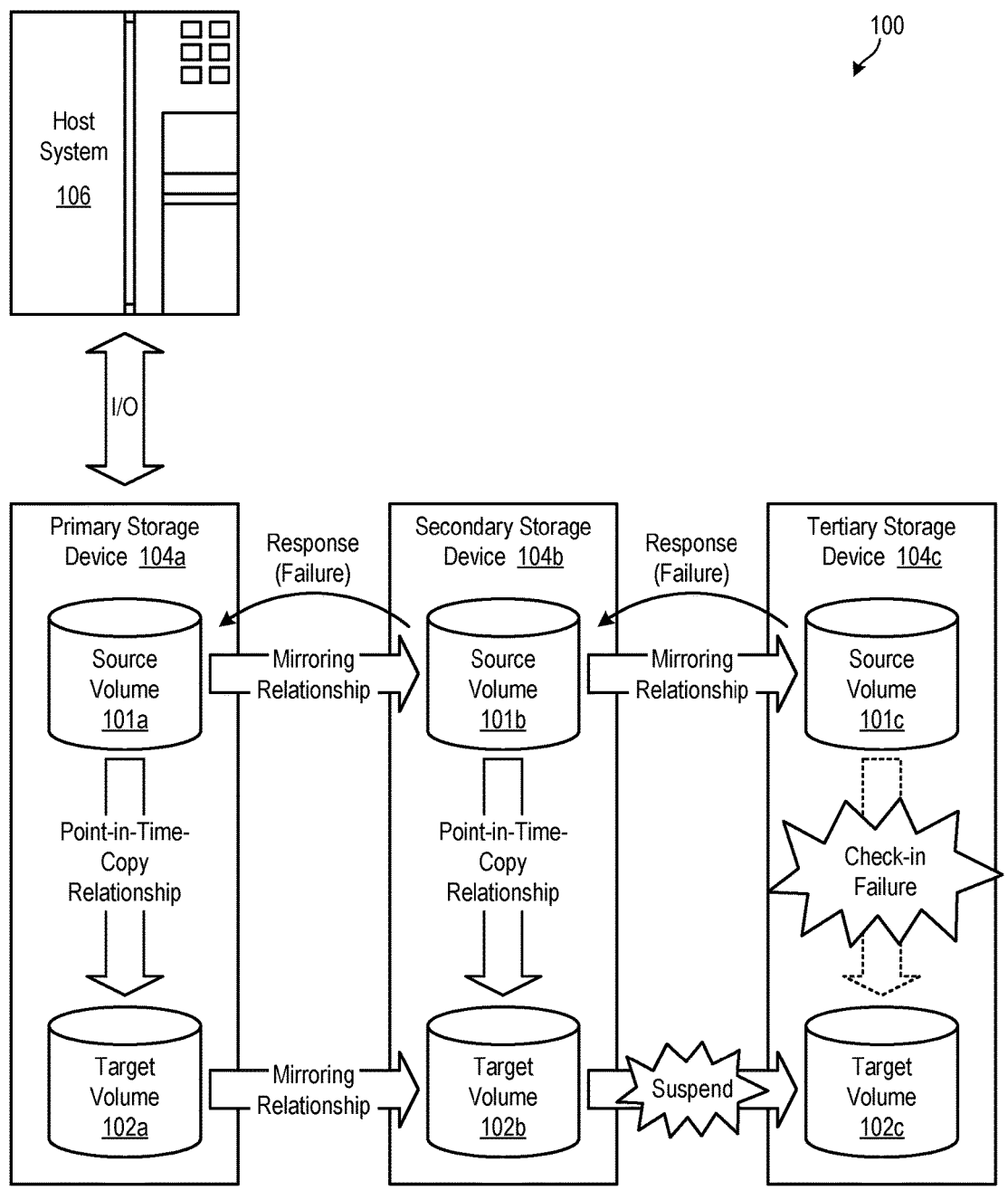
FIG. 7 is a high-level block diagram showing a scenario where a check-in request fails on the tertiary storage device.

FIG. 7 shows a scenario where a check-in request fails. Assume, in this scenario, that the tertiary storage device 104c was able to reserve resources needed to establish a point-in-time-copy relationship but was unable to establish the point-in-time-copy relationship upon receiving the check-in request. In such a scenario, the tertiary storage device 104c may respond to the secondary storage device 104b that the check-in request failed or the secondary storage device 104b may assume that the check-in request failed as a result of not receiving an acknowledgement. In such a scenario, the secondary storage device 104b may suspend the mirroring relationship between the target volume 102b and the target volume 102c, and set bits of an out-of-sync bitmap associated with the target volume 102b. The out-of-sync bitmap may be used to keep track of updates to the target volume 102b so that these updates may be mirrored to the target volume 102c when the mirroring relationship between the target volume 102b and target volume 102c is restored.

Figure 8:
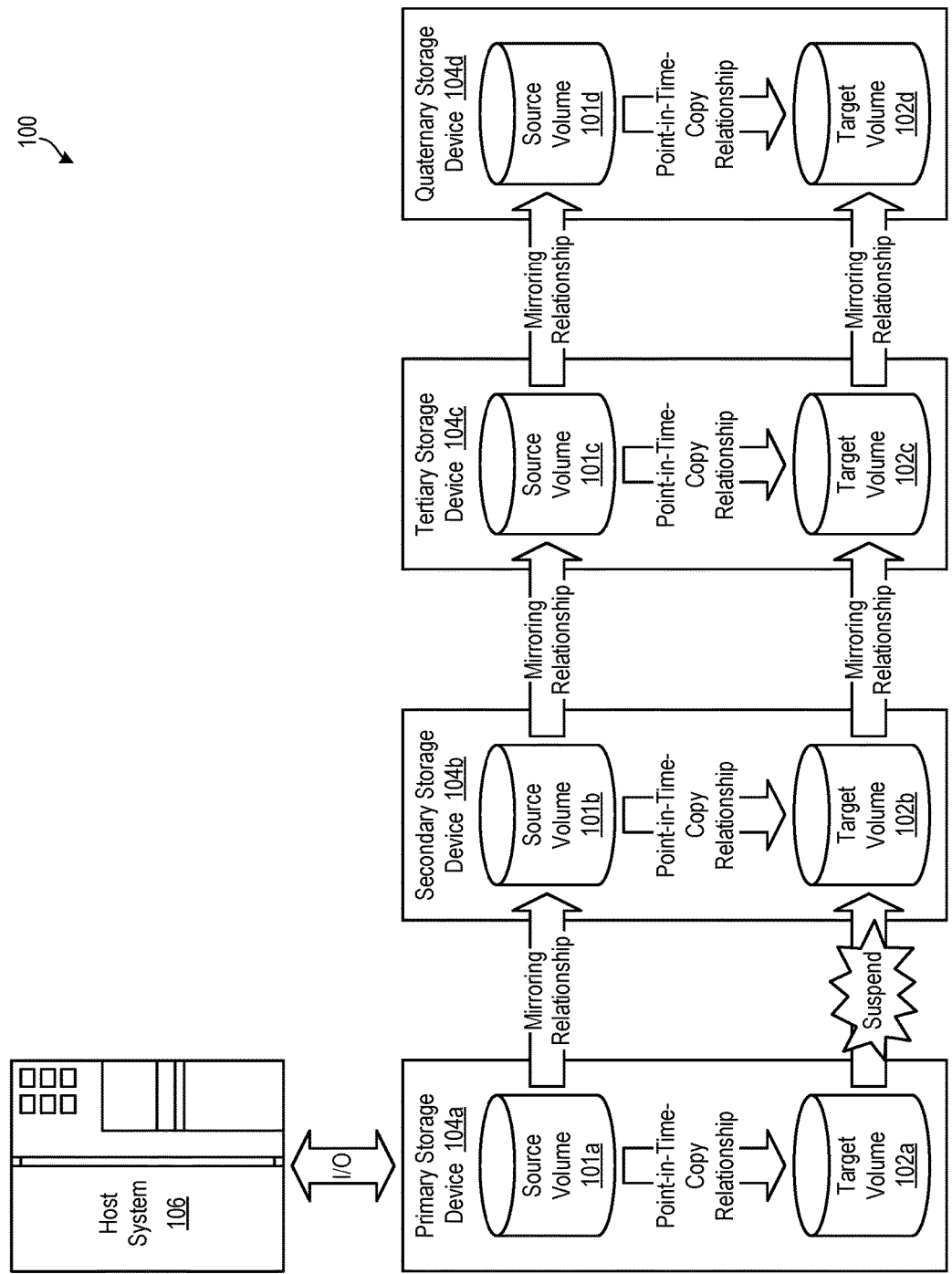
FIG. 8 is a high-level block diagram showing a data replication environment comprising more than three storage devices arranged in a cascaded configuration, and more particularly showing a technique for avoiding sending additional data over the long distance links between the target volumes in the event a mirroring relationship is suspended.

Referring to FIG. 8, as mentioned above, embodiments of the invention may be expanded to include additional cascaded relationships and the same principles may apply to pass reservation and check-in requests to the next downstream leg. FIG. 4 shows a data replication environment comprising an additional storage device 104d receiving data from the tertiary storage device 104c. As an additional enhancement to the systems and methods disclosed herein, if a check-in failure or other event causes a mirroring relationship to be suspended, for instance between target volume 102a and target volume 102b, embodiments of the invention may continue to utilize the point-in-time-copy relationships on the cascaded legs, for instance between the source volume 101c and the target volume 102c, and between the source volume 101d and the target volume 102d, to update the target volumes 102c, 102d and avoid sending additional data over the long distance bandwidth associated with the lower mirroring relationships. In such scenarios, indicators (bits of an out-of-sync bitmap, for example) may be set on the suspended primary volume (in this example the target volume 102a) for tracks or ranges of tracks that do not need to be transmitted through the lower downstream cascaded legs. Any writes to the suspended primary volume (in this example the target volume 102a) may cause the associated indicators to be reset so that the updated data may be transmitted downstream when the mirroring relationship between the target volume 102a and target volume 102b is reestablished.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for enabling point-in-time-copy target volumes to be primary volumes in cascaded data replication systems, the method comprising:
    reserving, on a first storage device, first resources needed to establish a first point-in-time-copy relationship between a first source volume and a first target volume;
    sending a reservation request to a second storage device to reserve second resources needed to establish, on the second storage device, a second point-in-time-copy relationship between a second source volume and a second target volume;
    in the event the reservation request is successfully executed, performing the following:
        establish the first point-in-time-copy relationship on the first storage device using the first resources; and
        send a check-in request to the second storage device to establish the second point-in-time-copy relationship on the second storage device using the second resources.

2. The method of claim 1, further comprising, in the event the reservation request is not successful, canceling the reservation of the first resources.

3. The method of claim 1, further comprising reporting, from the second storage device to the first storage device, whether the reservation request is successful.

4. The method of claim 1, further comprising establishing a first mirroring relationship between the first source volume and the second source volume.

5. The method of claim 4, further comprising establishing a second mirroring relationship between the first target volume and the second target volume.

6. The method of claim 5, further comprising, in the event the check-in request is not successful, suspending the second mirroring relationship.

7. The method of claim 6, further comprising, in the event the check-in request is not successful, setting bits of an out-of-sync bitmap associated with the first target volume.

8. A computer program product for enabling point-in-time-copy target volumes to be primary volumes in cascaded data replication systems, the computer program product comprising a computer-readable medium having computer-usable program code embodied therein, the computer-usable program code configured to perform the following when executed by at least one processor:
    reserve, on a first storage device, first resources needed to establish a first point-in-time-copy relationship between a first source volume and a first target volume;
    send a reservation request to a second storage device to reserve second resources needed to establish, on the second storage device, a second point-in-time-copy relationship between a second source volume and a second target volume;
    in the event the reservation request is successfully executed, perform the following:

establish the first point-in-time-copy relationship on the first storage device using the first resources; and send a check-in request to the second storage device to establish the second point-in-time-copy relationship on the second storage device using the second resources.

9. The computer program product of claim 8, wherein the computer-usable program code is further configured to, in the event the reservation request is not successful, cancel the reservation of the first resources.

10. The computer program product of claim 8, wherein the computer-usable program code is further configured to report, from the second storage device to the first storage device, whether the reservation request is successful.

11. The computer program product of claim 8, wherein the computer-usable program code is further configured to establish a first mirroring relationship between the first source volume and the second source volume.

12. The computer program product of claim 11, wherein the computer-usable program code is further configured to establish a second mirroring relationship between the first target volume and the second target volume.

13. The computer program product of claim 12, wherein the computer-usable program code is further configured to, in the event the check-in request is not successful, suspend the second mirroring relationship.

14. The computer program product of claim 13, wherein the computer-usable program code is further configured to, in the event the check-in request is not successful, set bits of an out-of-sync bitmap associated with the first target volume.

15. A system for enabling point-in-time-copy target volumes to be primary volumes in cascaded data replication systems, the system comprising:

at least one processor;

at least one memory device coupled to the at least one processor and storing instructions for execution on the at least one processor, the instructions causing the at least one processor to;

reserve, on a first storage device, first resources needed to establish a first point-in-time-copy relationship between a first source volume and a first target volume;

send a reservation request to a second storage device to reserve second resources needed to establish, on the second storage device, a second point-in-time-copy relationship between a second source volume and a second target volume;

in the event the reservation request is successfully executed, perform the following:

establish the first point-in-time-copy relationship on the first storage device using the first resources; and send a check-in request to the second storage device to establish the second point-in-time-copy relationship on the second storage device using the second resources.

16. The system of claim 15, wherein the instructions further cause the at least one processor to, in the event the reservation request is not successful, cancel the reservation of the first resources.

17. The system of claim 15, wherein the instructions further cause the at least one processor to report, from the second storage device to the first storage device, whether the reservation request is successful.

18. The system of claim 15, wherein the instructions further cause the at least one processor to establish a first mirroring relationship between the first source volume and the second source volume, and a second mirroring relationship between the first target volume and the second target volume.

19. The system of claim 18, wherein the instructions further cause the at least one processor to, in the event the check-in request is not successful, suspend the second mirroring relationship.

20. The system of claim 19, wherein the instructions further cause the at least one processor to, in the event the check-in request is not successful, set bits of an out-of-sync bitmap associated with the first target volume.

* * * * *